(12) United States Patent
Verbeek

(10) Patent No.: US 8,635,945 B2
(45) Date of Patent: *Jan. 28, 2014

(54) PACKAGE AND DEVICE FOR THE PREPARATION OF FOOD PRODUCT SUCH AS BEVERAGE

(75) Inventor: Roland Waldemar Verbeek, Blaricum (NL)

(73) Assignee: Cupsystem Company B.V., Naarden (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/549,241

(22) Filed: Jul. 13, 2012

(65) Prior Publication Data

US 2012/0276255 A1 Nov. 1, 2012

Related U.S. Application Data

(62) Division of application No. 12/223,815, filed as application No. PCT/NL2007/000046 on Feb. 16, 2007, now Pat. No. 8,220,382.

(30) Foreign Application Priority Data

Feb. 17, 2006 (NL) ...................................... 1031177

(51) Int. Cl.
*A47J 31/44* (2006.01)
*B65B 29/02* (2006.01)

(52) U.S. Cl.
USPC .................. 99/295; 99/323; 426/77; 426/115

(58) Field of Classification Search
USPC .............. 99/295, 323, 302 R; 426/77, 78, 79, 426/112, 115

See application file for complete search history.

(56) References Cited

U.S. PATENT DOCUMENTS

| 4,471,689 | A | 9/1984 | Piana |
| 4,921,640 | A | 5/1990 | Wu |
| 7,878,108 | B2 | 2/2011 | Mock et al. |
| 2005/0103204 | A1 | 5/2005 | Halliday et al. |
| 2011/0113968 | A1 | 5/2011 | Schmed et al. |

FOREIGN PATENT DOCUMENTS

| EP | 1 440 913 A1 | 7/2004 |
| WO | WO 2006/137737 A2 | 12/2006 |

*Primary Examiner* — Reginald L Alexander
(74) *Attorney, Agent, or Firm* — Birch, Stewart, Kolasch & Birch, LLP

(57) ABSTRACT

A package for a portion of liquid foodstuff dilutable with a diluent includes a reservoir for containing a portion of liquid foodstuff dilutable with a diluent, a reservoir seal for closing the reservoir, a mixing element for mixing the dilutable liquid foodstuff with the diluent. The mixing element includes a mixing chamber having an outflow aperture for dispensing liquid foodstuff diluted with the diluent, a liquid passage for feeding dilutable liquid foodstuff from the reservoir to the mixing chamber, and a feed channel for feeding diluent to the mixing chamber. The feed channel has a first portion and a second portion, the cross section of the second portion being smaller than the cross section of the first portion and be so configured that when diluent is fed to the mixing chamber, a venturi effect occurs in the mixing chamber.

19 Claims, 7 Drawing Sheets

Figure 1:
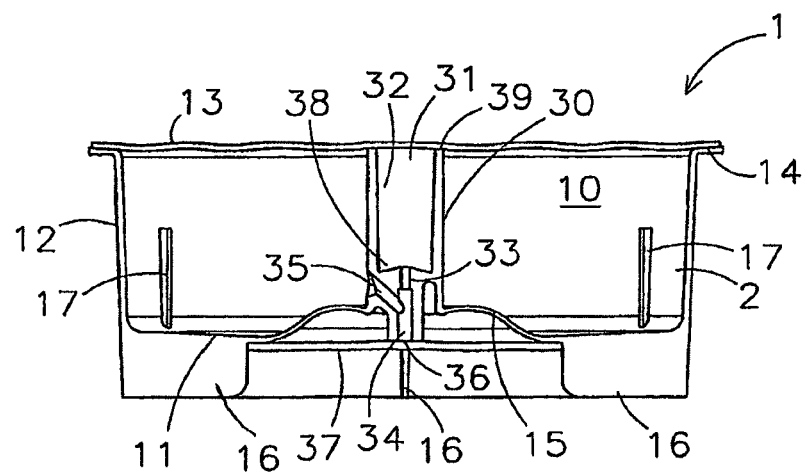

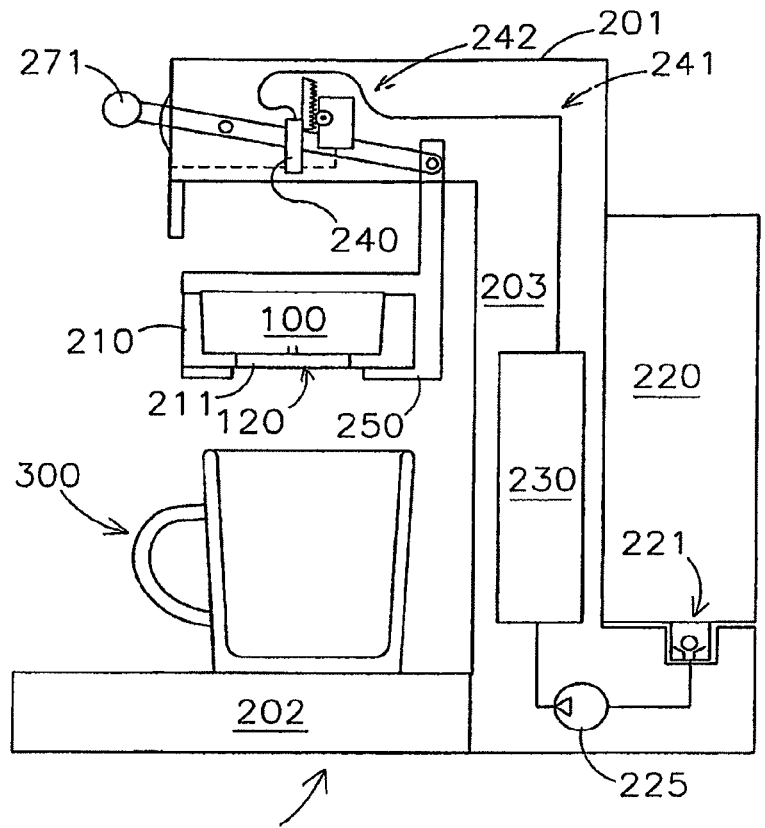
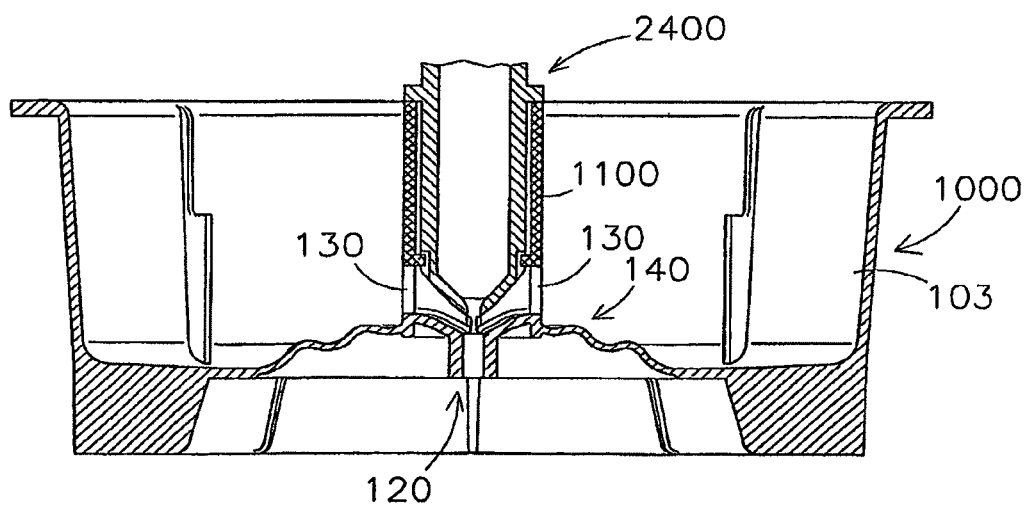
Fig 14
Fig 15

PACKAGE AND DEVICE FOR THE PREPARATION OF FOOD PRODUCT SUCH AS BEVERAGE

This application is a Divisional of application Ser. No. 12/223,815 filed on Dec. 10, 2008 now U.S. Pat. No. 8,220,382, which is the national phase of PCT International Application No. PCT/NL2007/000046 filed on Feb. 16, 2007, and which claims priority to Application No. 1031177 filed in The Netherlands on Feb. 17, 2006. The entire contents of all of the above applications are hereby incorporated by reference.

The invention relates to the preparation of a food product suitable for human consumption. In a preferred embodiment the invention relates to the preparation of a beverage or component of a beverage, in particular the preparation of milk froth. The invention is suitable in particular for the preparation of milk froth for a cappuccino.

In the invention use is made of a package, which is preferably disposable, filled with a portion of dilutable liquid foodstuff or a liquid ingredient to be mixed with a base liquid.

The invention also proposes a device which can be used in combination with the package.

A disposable package with a reservoir filled with a portion of dilutable liquid foodstuff or liquid ingredient is known. In a known embodiment a separate mixing element, provided with a mixing chamber, is fixed on the reservoir made of plastic. A vacuum is produced in the mixing chamber by creating a venturi effect, so that the dilutable liquid foodstuff or the liquid ingredient is drawn out of the reservoir. This known package is complex and consequently expensive to produce. In addition, the known package requires many assembly steps during its production, which increases the cost even further.

One object of the invention is to provide an improved package.

Another object is to provide a package which can be mass-produced at relatively low cost.

Another object is to provide a package which can be handled in an attractive manner on a filling unit for filling the package, for example with a milk ingredient.

Another object is to provide a package which is reliable when it is a matter of food safety.

Another object is to provide a package which is easy for the user to use, particularly for use by a consumer in the home.

In order to achieve one or more of the abovementioned objects, the invention according to a first aspect thereof provides a package.

In the package according to the first aspect of the invention the plastic body is produced in one piece by means of injection moulding. This means that a separate assembly step is no longer necessary in the production. Making the body of one piece also means that the shape of the mixing element or column can be kept relatively simple because no assembly is required. Furthermore, sealing problems do not occur in such a monolithic construction.

In an advantageous embodiment the body has a bottom, and the mixing element or column is connected directly to the bottom. The mixing element or column then in fact stands in the reservoir.

The bottom preferably has a flexible portion. The mixing element or column can consequently be moved, preferably particularly in the vertical direction, relative to a non-flexible portion of the bottom and/or relative to the circumferential wall. This possibility of movement can be used for opening or otherwise activating the package, as will be explained further.

In a possible embodiment the flexible bottom portion is provided in the form of a protuberance.

Provision can also be made for the flexible bottom portion to be of a bistable design. The mixing element or column in that case has a first stable position and a second stable position, which is preferably lower than the first stable position.

For example, the protuberance projects upwards in the reservoir in the first stable position and downwards relative to the reservoir in the second stable position. The protuberance of the portion of the bottom concerned makes it possible to move the mixing element or column connected to said protuberance into another, lower position relative to the remainder of the reservoir. This possibility of movement can be used for opening or otherwise activating the package and assists with the emptying of the reservoir.

The movable arrangement of the mixing element or column is used in an advantageous embodiment for opening the package, notably for opening a seal on the underside of the package in that way.

In an advantageous embodiment a breakable or removable seal, for example with a plastic film or plasticized aluminium foil, is provided at the outlet aperture situated on the underside of the package. Said seal is, for example, connected to a rigid portion of the bottom, in other words a portion of the bottom lying around the flexible portion. In the initial position, which can correspond to the first stable position if a bistable protuberance has been provided, the protuberance projects inwards in the reservoir. Pressing the mixing element or column down now causes the protuberance to be moved downwards. In the case of a bistable protuberance the latter is preferably taken into its second stable position as a result, in which case the protuberance points outwards. The underside of the mixing element or column is also moved down in the process, and in doing so pierces the bottom seal, which is applicable particularly if a sealing film or foil is provided. In another embodiment of this seal it is, for example, the case that the downward movement causes the seal to be pushed away to the side. For example, a sealing element with a hinged arm is fixed on the underside of the package, in such a way that during downward movement said sealing element swings away out of the path of the dispensed jet.

In an advantageous embodiment the mixing element or column is placed substantially in the centre of the reservoir. It has been found in practice that a good discharge out of the package can be achieved in this way.

In one embodiment the circumferential wall forms a filling aperture on the upper side and a reservoir seal or top seal which protects the contents of the package from the atmosphere is provided there. In this way the reservoir can be filled through a relatively large filling aperture, after which a top seal can be placed in a simple manner, for example with known equipment for placing a film or foil seal over an aperture on the upper side of a plastic package.

It is advantageous if the reservoir seal or top seal is breakable at the position of the channel, notably can be pierced or removed by a lance.

It is not necessary for a seal also to be present between the reservoir and the channel. The absence of such a seal leads to a simpler production of the package.

The package according to the first aspect of the invention, through its simple production and possible low cost, is suitable for mass production and as a disposable package for a single use.

According to a second aspect of the invention, a package is provided. In the case of this package provision is made for the column—through the engagement of a base liquid feed lance on to the column—to be moved from a higher initial position higher to a lower dispensing position.

This movability of the column has already been described and explained above with reference to the preferred embodiments of the package according to the first aspect of the invention. In that first aspect of the invention the body of the package is made monolithically of plastic material. That construction detail is an advantageous embodiment, but is not essential in the case of the package according to the second aspect of the invention. In particular, a package according to the second aspect of the invention could be made of several components which are assembled. For example, in the case of the package according to the second aspect of the invention the column is made separately and fitted later on the component forming the circumferential wall and bottom of the package.

For example, the package according to the second aspect of the invention is designed specifically for multiple use. For example, this package is dishwasher-safe.

For example, the circumferential wall and an annular part of the bottom are made of metal, such as stainless steel, the flexible portion of the bottom being formed by a suitable elastomeric component, and the column being also of stainless steel or another suitable material. Such a package can have a large filling aperture on the upper side, for example just as explained in the case of suitable embodiments of the package according to the first aspect of the invention, but the filling aperture can also be smaller or can be in a different place. For example, the package can have a cover (preferably removable or hinged) with a hole above the column, so that a lance can act upon the column. When the cover has been removed or is open the user can then fill the package and put on or close the cover, and can then place the package in a suitable device.

The invention furthermore relates to a system for the preparation of a food product suitable for human consumption.

The invention also relates to a device for preparation of a beverage.

The invention also relates to a device for preparation of a food product suitable for human consumption.

The device has a holder for accommodation of a package according to the invention.

The device can also be provided with several holders for simultaneous accommodation of several packages according to the invention or of several types of holders, for example one for accommodation of a package according to the invention and one for another type of package, for example a coffee pad.

The invention also relates to such a device which does not accommodate a package according to the invention, but two different packages, preferably single-portion disposable packages, the device having, for example, a lance which connects to a channel in one of said packages and then, on the basis of some suction effect or other, draws a liquid ingredient out of the reservoir of said package and subsequently mixes it with liquid, such as (hot) water, supplied through the lance. A package according to the invention is preferred here. The first and second package can preferably be placed by the user in a common holder.

The device preferably has a water feed means which connects to a feed lance for the diluent or base liquid. The lance and the holder for the package(s) are preferably movable relative to each other by means of suitably designed controllable movement means of the device.

The lance and the package(s) can be moved relative to each other, for example when the user closes the device after placing the package in the device. In that case the operable displacement means are operated by closing the system. It is, however, also possible for the lance and the package(s) to move relative to each other when the user actuates the system, for example by means of a push button. In that case the operable displacement means are operated by activating the system.

In an advantageous embodiment the lance is adapted to break or remove a seal provided over the channel of a package. During insertion of the lance into the inlet of the channel the lance can pierce and/or push away the seal.

In a further advantageous embodiment the lance is equipped to act upon the mixing element or column in order to deform the flexible portion of the bottom of a package and thus take the mixing element or column into a different position, preferably downwards relative to the initial position.

For instance, during use of a package with a protuberance, bistable or otherwise, in the bottom said protuberance can be taken from the first position into the second position by the lance. During this process any seal which may be present over the outflow aperture of the package can be broken or removed.

Apart from that, it is also possible to realize a reusable package on the basis of the package according to the first aspect of the invention.

The package can be used, for example, for preparing coffee, cappuccino, drinking chocolate, broth, fruit juice or soft drinks.

It is advantageous if the package is sterilizable, because in that case the contents of the package do not have to be subjected to a high temperature for a long time. If the package is filled with, for example, concentrated milk or concentrated orange juice, this is beneficial for the quality and the taste of the contents.

Packages according to the invention and also devices and systems are described further in the claims and will be described below in a non-limitative way with reference to the appended drawing.

Figure 2:
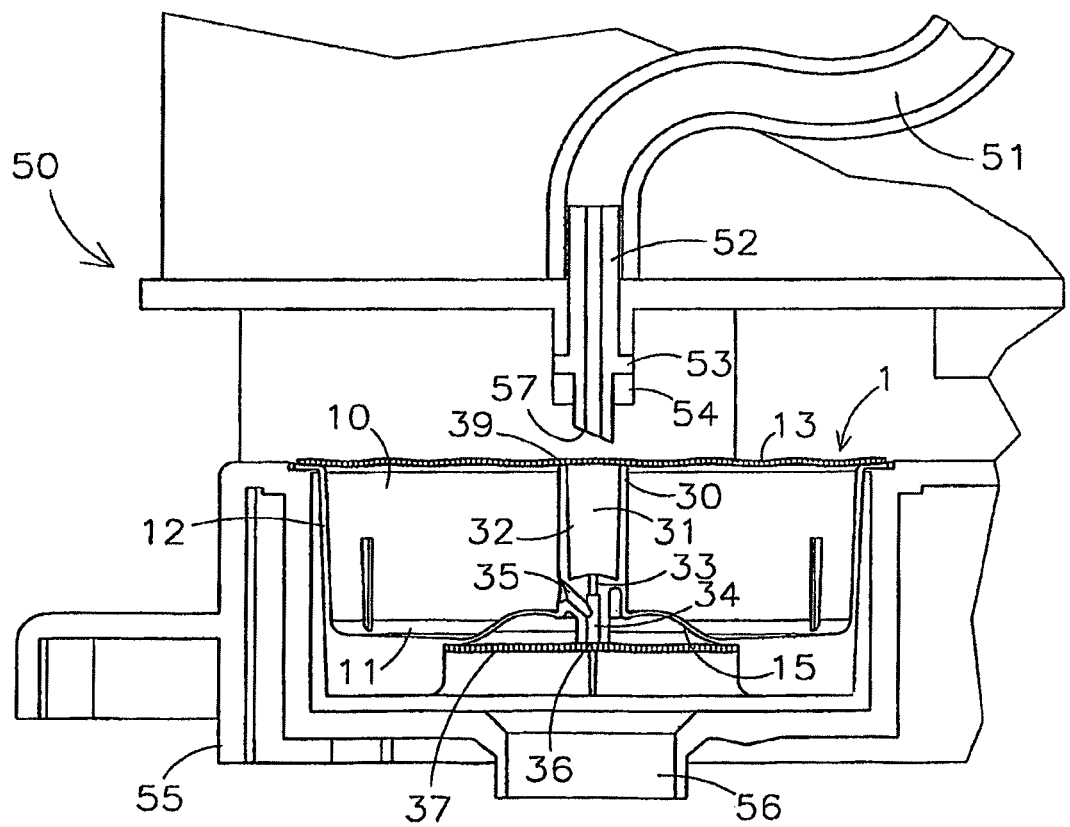
Figure 3:
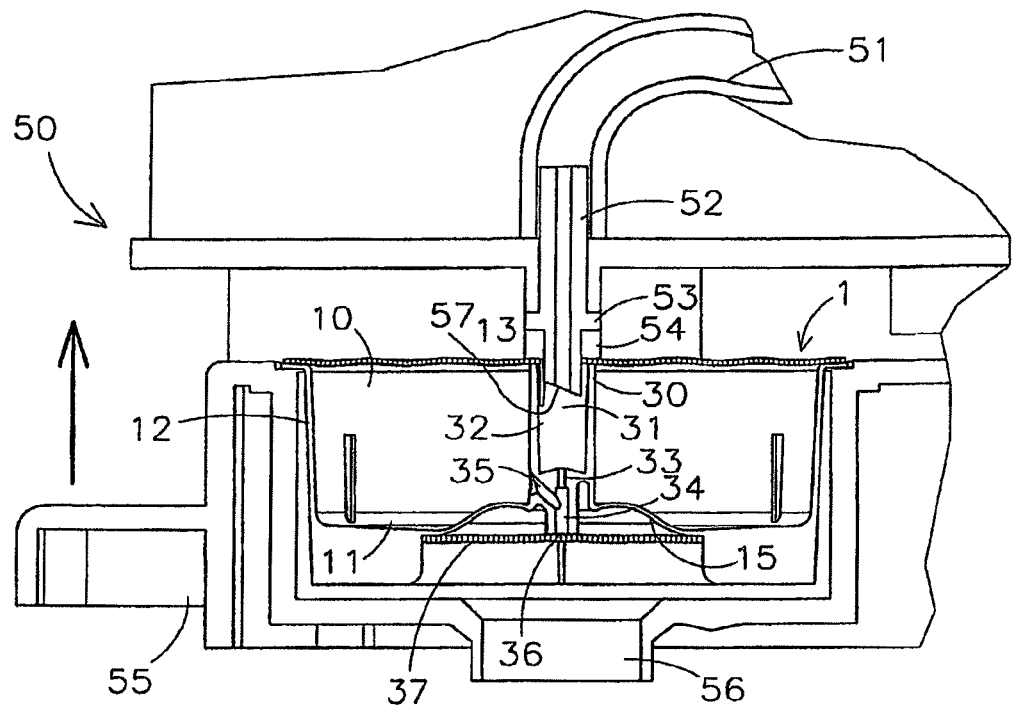
Figure 4:
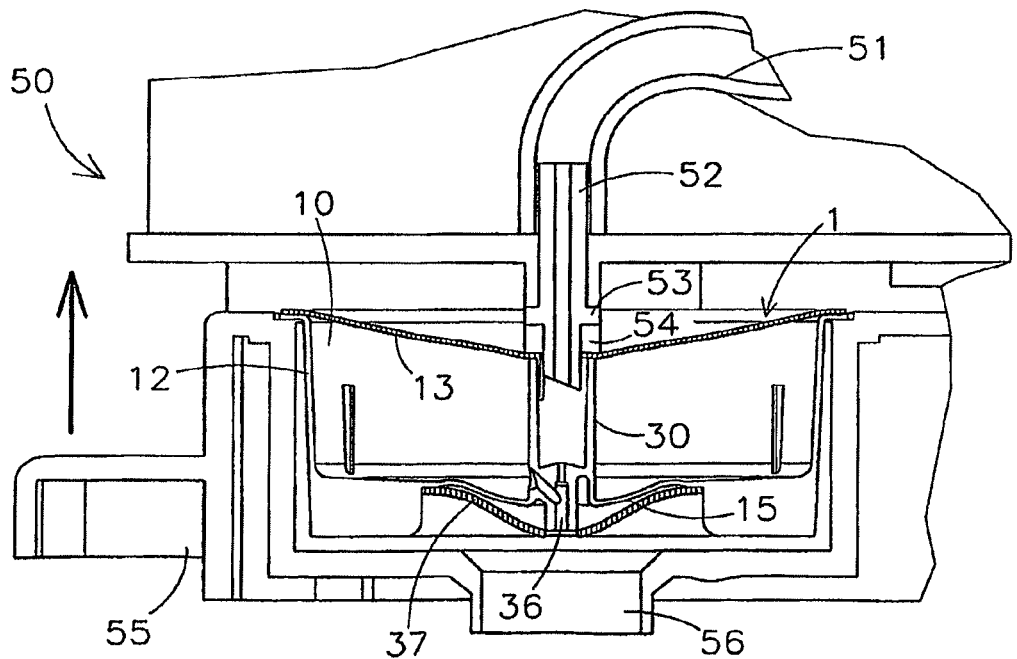
Figure 5:
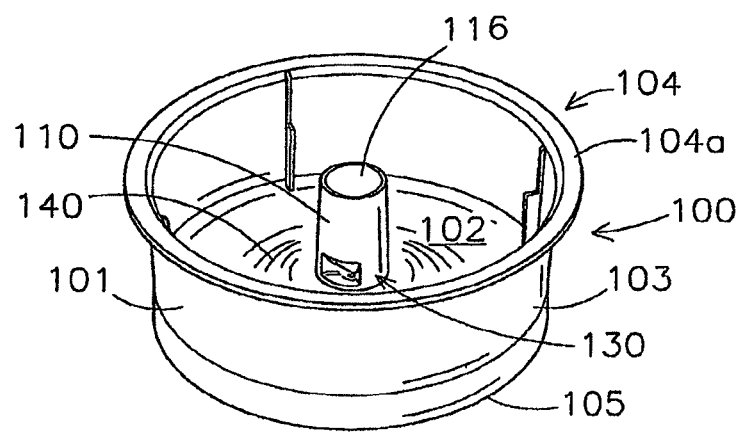
Figure 6A:
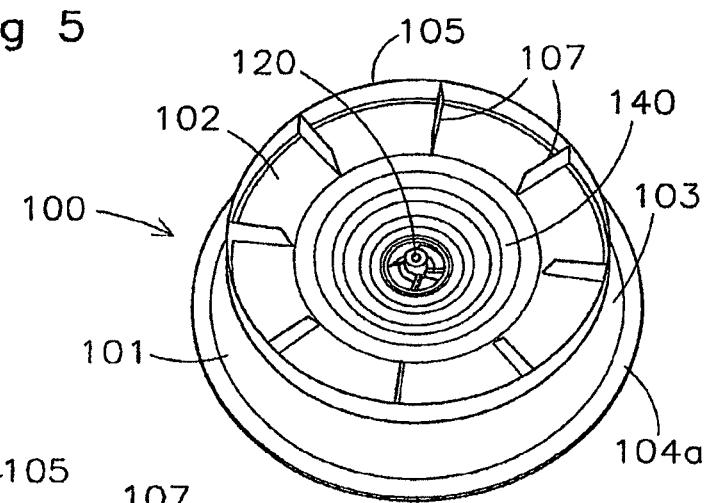
Figure 6B:
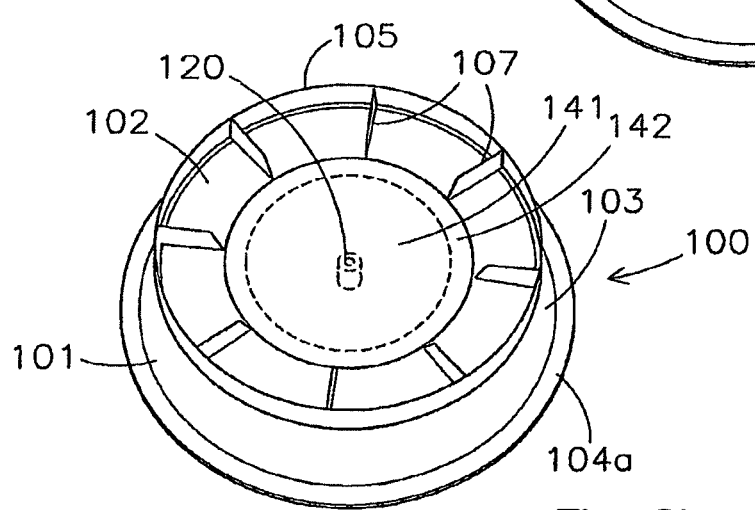
Figure 7:
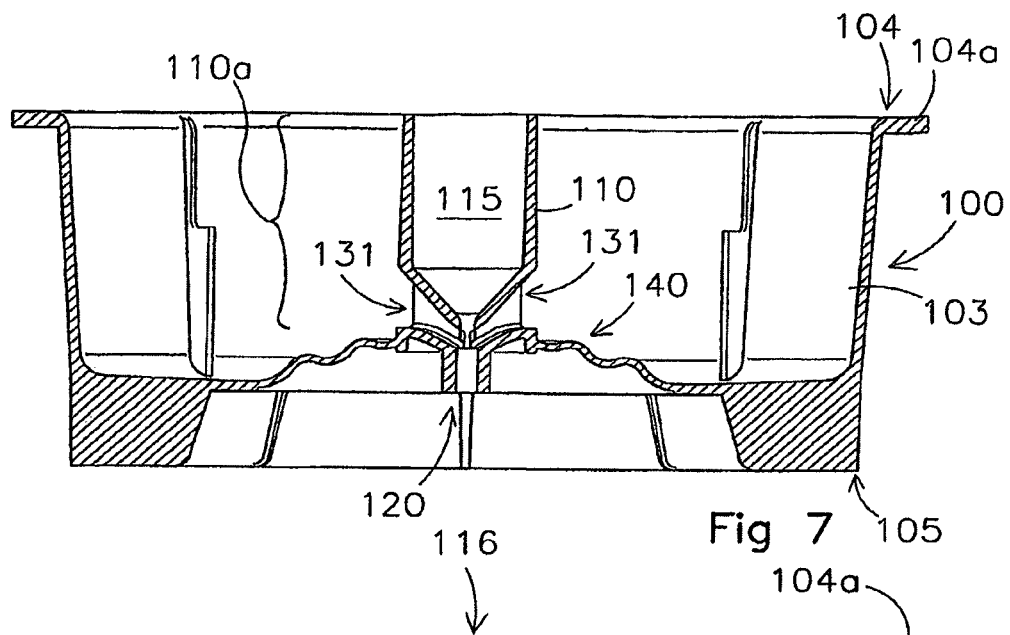
Figure 8:
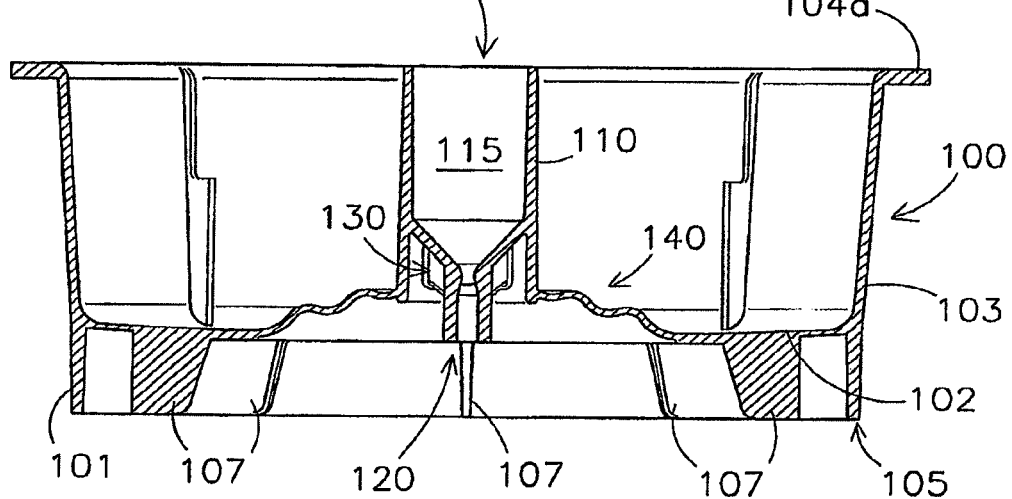
Figure 9:
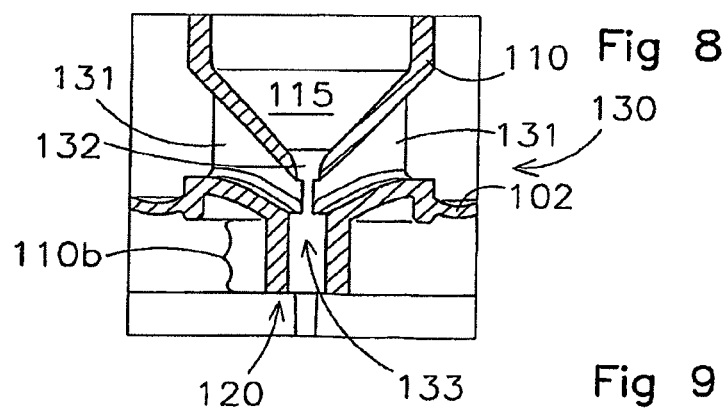
Figure 10:
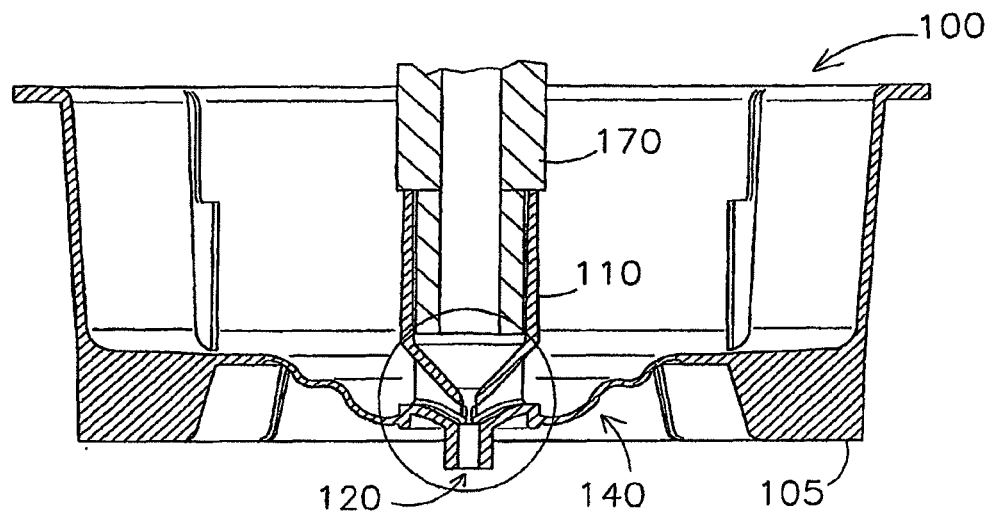
Figure 11:
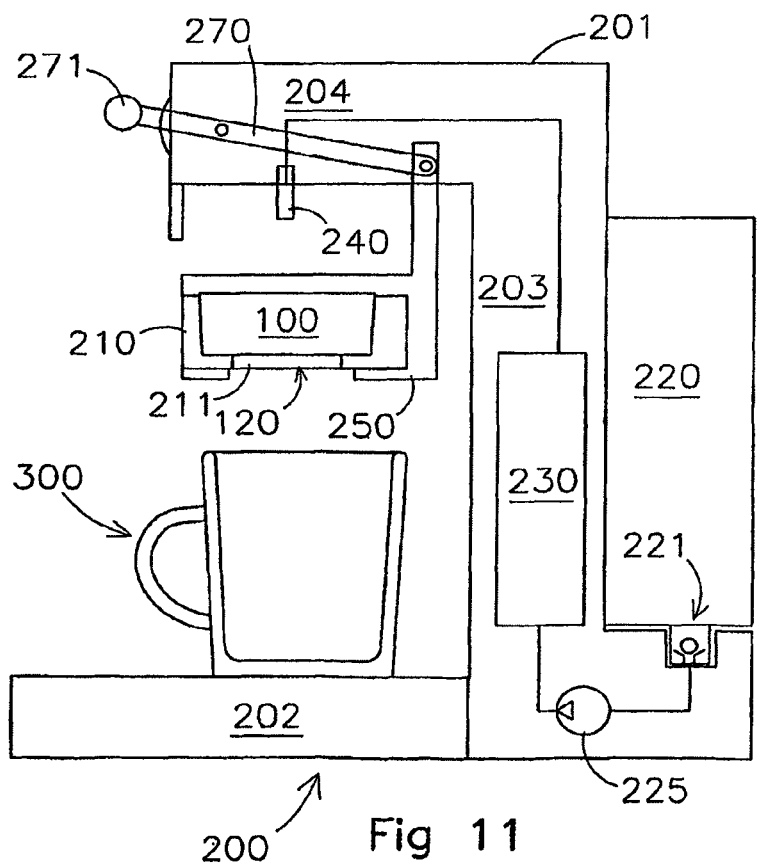
Figure 12:
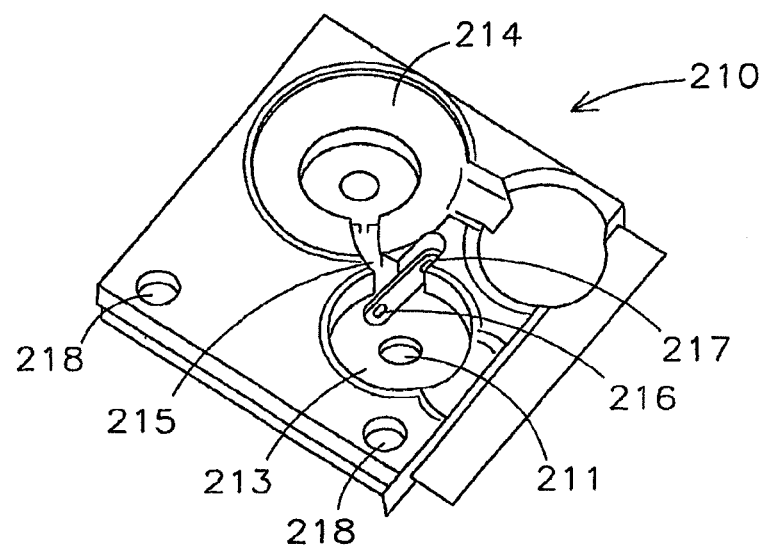
Figure 13:
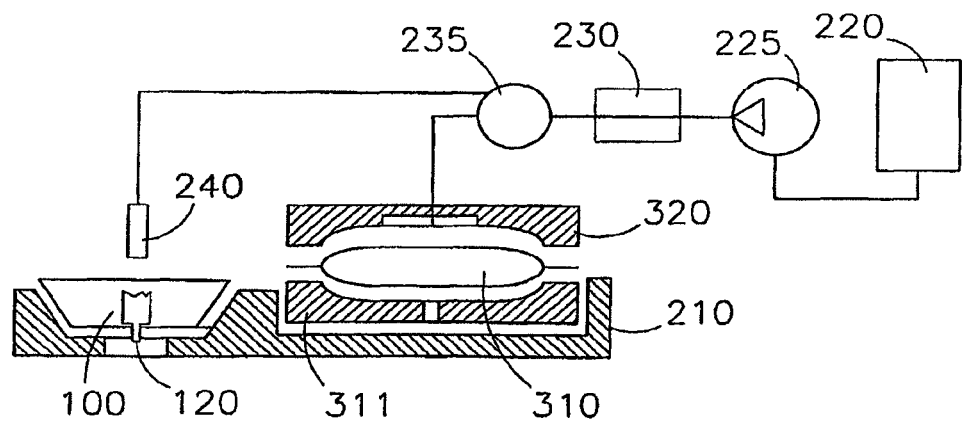

The drawing shows in:

FIG. 1: a first embodiment of a package according to the invention, in cross section;

FIG. 2: the embodiment of the package according to FIG. 1 in a device according to the invention, in a first phase of use;

FIG. 3: the embodiment of the package according to FIG. 1 in a device according to the invention, in a second phase of use;

FIG. 4: the embodiment of the package according to FIG. 1 in a device according to the invention, in a third phase of use;

FIG. 5: the body of a second embodiment of the package according to the invention, in a view from the top in perspective;

FIG. 6a: the body of FIG. 5 in a view from the bottom in perspective;

FIG. 6b: the illustration of FIG. 6a with bottom sealing film;

FIG. 7: the body of FIG. 5 in vertical section with the column in the initial position;

FIG. 8: the body of FIG. 5 in another vertical section;

FIG. 9: a detail of the body of FIG. 5 on a larger scale in the initial position of the column;

FIG. 10: a part of the body of FIG. 5 with the column in the dispensing position;

FIG. 11: diagrammatically an example of a device suitable for combination with a package according to the invention;

FIG. 12: diagrammatically an example of a holder for the system according to the invention;

FIG. 13: diagrammatically in section the holder of FIG. 12 and corresponding parts of the device of the system according to the invention;

FIG. 14: diagrammatically an example of an alternative device suitable for combination with a package according to the invention;

FIG. 15: diagrammatically a part of an example of an alternative system according to the invention.

FIG. 1 shows a first embodiment of a package 1 according to the invention. The package 1 comprises a reservoir 10 and a mixing element or column 30. The reservoir 10 is intended for the accommodation of a dilutable liquid foodstuff or liquid ingredient for a foodstuff suitable for human consumption. The package can be filled with, for example, a portion of concentrated milk, concentrated fruit juice or concentrated broth.

The reservoir 10 is preferably filled approximately ⅔ full, preferably through the aperture formed by the circumferential wall on the upper side of the package 1. The reservoir 10 is then closed by a reservoir seal 13.

The reservoir seal 13 is preferably a suitable film, for example a plastic film and/or metal foil (possibly multilayer).

The reservoir seal is preferably slightly elastic, for example through the use of a PE film. The sealing film 13 is preferably fixed by means of a fusion weld on the upper edge of the circumferential wall of the package 1. On a closed package the reservoir seal 13 is fixed on the reservoir by means of the sealing edge 14.

The reservoir 10 has a bottom 11 and a circumferential wall 12. The circumferential wall 12 is preferably of a slightly tapered design, the remaining shape of the package preferably being such that the empty packages 1 which are not yet filled and provided with a sealing film are nestable.

For making, for example, milk froth for the preparation of cappuccino the package has a circumferential wall with a diameter of 55 millimeters and a height of 23 millimeters.

The package can be made of food-grade plastic, for example PP or PE.

It is not necessary also to provide a seal between the reservoir 10 and feed channel 31, for example by connecting the reservoir seal 13 also to the upper edge 39. If such a seal is not present, liquid foodstuff can run into the feed channel 31, for example during conveyance of the package, but during use it is flushed out again by the diluent or base liquid. The absence of a seal between the reservoir 10 and the feed channel 31 makes production of the package according to the invention considerably simpler.

The bottom 11 of the reservoir 10 in this example is stiffened by means of stiffening ribs 16. A number of stacking lugs 17, for example three, are provided on the inside of the circumferential wall 12. The stacking lugs 17 ensure that damage is not caused to the mixing element 30 during the nesting of empty packages 1.

In the example shown the package 1 is substantially discshaped. A circular symmetrical shape such as a disc has the advantage that the package can be placed in any desired orientation in a holder. If a particular orientation is still desired, the circular symmetrical shape can be departed from, so that the package can be placed in only one way in the holder.

It can be seen clearly in FIG. 1 that a protuberance 15 is provided in the bottom 11 of the package 1. The mixing element 30 is present on said protuberance 15.

The feed channel 31, with inlet on the upper side of the mixing element, is formed in the mixing element 30 during the injection moulding, and a mixing chamber 34 is also co-moulded during the injection moulding. Liquid foodstuff or ingredient from the reservoir 10 can be mixed with a diluent in said mixing chamber 34. The liquid foodstuff or ingredient from the reservoir is fed to the mixing chamber 34 through one or more ducts or passages 35, here a single passage 35, formed in the mixing element during the injection moulding. The diluent or base liquid is fed to the mixing chamber 34 through the feed channel 31.

The feed channel 31 has a first portion 32 and a second portion 33. As can be seen clearly in FIG. 1, the second portion 33 of the feed channel 31 has a cross section which is significantly smaller than the cross section of the first portion 32 of the feed channel 31 and of the mixing chamber 34. The ratio between the cross sections of the two portions 32, 33 and the mixing chamber 34 is selected in such a way that when diluent, for example water, is fed in through the feed channel 31 to the mixing chamber 34 a venturi effect occurs in the mixing chamber 34. Said venturi effect creates a vacuum in the mixing chamber 34, with the result that liquid foodstuff flows out of the reservoir 10 through passage 35 into the mixing chamber 34. The turbulence as a result of the venturi effect also ensures good mixing of the liquid foodstuff or ingredient from the reservoir 10 with the diluent or base liquid.

The selection of the cross section of the passage 35 in relation to the cross section of the second portion 33 of the feed channel 31 partly determines the mixing ratio between the liquid foodstuff or ingredient, on the one hand, and the diluent or base fluid, on the other hand. Making the parts of the injection mould that determine the respective cross sections removable from the mould means that these cross sections are relatively easy to change.

The mixture leaves the mixing chamber 34 through the outflow aperture 36 on the underside of the package 1. When the package is closed said outflow aperture 36 is sealed by a suitable seal 37. Said seal 37 can be in various forms. An example is a cap or a sealing film or foil, which is removed by the user before use. The seal can also be removed or broken automatically when the package is placed in a suitable device according to the invention and the device is then activated.

It can be seen in FIG. 1 that the second portion 33 of the feed channel 31 in this illustrated embodiment does not connect up to the lowest point of the first portion 32 of the feed channel 31. This means that a dead space 38 is produced. Any sediment from the liquid foodstuff to be diluted can settle in said dead space 38 without the second portion 33 of feed channel 31 becoming blocked.

FIG. 2 shows the embodiment of the package 1 according to FIG. 1 in a device 50 according to the invention, in a first phase of use.

The device 50 according to the invention comprises a holder 55, in which a package 1 according to the invention can be placed. FIG. 2 shows a package 1 placed in the holder 55. The holder 55 is situated in a low position, so that there is still some distance between a lance 52 of the device which is connected to a suitable water supply 51, on the one hand, and the feed channel 31 of the package 1, on the other hand.

The protuberance 15 in the bottom 11 of the reservoir is raised and therefore facing inwards in this phase. The bistable protuberance 15 is now situated in its first stable position.

FIG. 3 shows the embodiment of the package 1 according to FIG. 1 in a device 50 according to the invention, in a second phase of use.

The holder 55 has now moved upwards in the direction of the lance 52. The free end of the lance 52 is now projecting into the first part 32 of the feed channel 31. The slanting side 57 of the lance 52 has broken through the part of the reservoir seal 13 which sealed the feed channel 31. The water feed means 51 can now feed water to the mixing chamber 34 through the feed channel 31.

The major part of the reservoir seal 13 is still intact. This prevents splashing and consequently soiling of the device 50. It is otherwise conceivable for one or more small holes also to be pierced in the reservoir seal 13 when the holder 55 is moved upwards. This prevents undesired pressures, for example in that the package draws vacuum during emptying of the reservoir 10. A suitable projection can be provided on the lance 52 for this purpose, if desired.

Instead of the holder 55 moving upwards to the lance 52, it is also possible for the lance 52 to move downwards.

FIG. 4 shows the embodiment of the package 1 according to FIG. 1 in a device 50 according to the invention, in a third phase of use.

The holder 55 has now moved slightly further upwards, in the direction of the lance 52. In this embodiment the lance 52 has a collar 53, which is preferably provided with a rubber ring 54. The collar 53 exerts a downwardly directed force by way of ring 54 upon the mixing element 30. The result is that the protuberance 15 is deformed and springs into its second stable position, in which the protuberance 15 is directed outwards. The mixing element 30 is moved downwards as a result. During this process the underside of the mixing element 30 pierces the sealing film 37 extending along the bottom of the outflow aperture 36 of the mixing chamber 34.

The holder 55 has a dispensing aperture 56 through which the mixture of liquid foodstuff or ingredient from the reservoir 10 and diluent or base liquid can leave the device 50. The dispensing aperture 56 is preferably so wide that the mixture does not come into contact with the device 50. Soiling of the device 50 is prevented in that way.

Through the elasticity of the material of the reservoir seal 13, the upper side of the reservoir 10 remains substantially closed in the embodiment shown, except for the hole for the lance 52. This prevents soiling of the device 50.

In an alternative embodiment the protuberance 15 can also be of a non-bistable design. This means that a force remains upon the mixing element 30 and upon the lance 52 during emptying of the reservoir.

The invention furthermore also provides an embodiment in which, in addition to at least one recess for the accommodation of a package according to the invention, the holder 55 also has at least one recess for the accommodation of a coffee pad. In that situation when a package filled with concentrated milk and a coffee pad are placed in the holder a cup of cappuccino can be prepared.

A second exemplary embodiment of the package according to the invention will now be explained with reference to FIGS. 5-10.

These FIGS. 5-10 show a plastic body of a disposable package 100, which can be filled with a portion of a liquid ingredient intended for mixing with a base liquid for a food product suitable for human consumption, notably a beverage which can be cold or hot as desired.

Before filling, the package is preferably sterilized, and the filling is preferably performed under aseptic conditions. In that case the package is also sealed under aseptic conditions, so that the ingredient is protected from the atmosphere.

A particularly interesting application is when the package is filled with a milk ingredient, which is mixed with hot water, preferably at a temperature of at least 70 degrees Celsius, preferably not boiling, as the base liquid, so that milk froth on top of a cup of coffee, for example such as cappuccino, or for example on hot chocolate, can be obtained.

For example, the package is filled with a milk concentrate that remains stable when stored at room temperature, for example milk that is sterilized for 1 to 5 seconds at 116-122 degrees.

It will be clear that the package can also contain another liquid beverage preparation ingredient or an ingredient for preparing another food product, such as a soup. As already mentioned, the food product to be prepared can also be cold, for example if the ingredient is mixed with cold or even chilled water, possibly even carbonated water.

The food product to be prepared with the package does not have to be in a frothed form, as appears, for example, from examples mentioned earlier such as the preparation of fruit juice.

If it is desired that little or no froth should be formed on the dispensed mixture, the geometry of the venturi portion and/or of the passages connecting to it can be adapted. Of course, the ingredient itself also has an influence on any froth formation, and the froth formation or absence of froth formation can also be influenced by adapting the recipe of the ingredient.

It appears, for example in the case of milk froth, that the distance of the outflow aperture of the package from the bottom of a mug or the like into which the mixture is dispensed can also play a role in the froth formation. For instance, experiments seem to demonstrate that a relatively great distance leads to a large quantity of froth with fairly large bubbles and consequently limited stability. Reduction of that distance can then produce a more stable froth with finer bubbles.

For example, milk froth with bubbles which are substantially less than 1.5 millimeters is obtained.

In particular, the package according to the invention and a suitable device can be used first to prepare a relatively thick milk froth layer, preferably over 1 centimeter thick, in a cup or the like to be used by the consumer, and then (preferably with the same device or possibly with another device) to prepare coffee, preferably on the basis of a coffee pad or another single-portion coffee ingredient package, which goes in a jet or stream from above onto the milk froth layer and sinks down through said froth layer. A thick, firm layer of milk froth is ultimately obtained on the top of the coffee, so that a cappuccino is prepared. The device is possibly equipped for the preparation of a café crème with a thin, fine-frothed creamy layer, on top of which the thick, firm froth layer obtained with the package according to the invention then lies.

It is for example a possibility that the package contains a quantity of ingredient which is mixed with a certain quantity of base liquid, and that, if all of the ingredient in the package has been discharged, base liquid is still supplied by the device to the channel of the package. The effect is then that a relatively strong jet of base liquid goes onto the mixture already dispensed into a cup or the like, so that the mixture can be made to froth well. This was found, for example, during the preparation of milk froth described earlier, in the case of which, for example, 15-30 ml of milk ingredient is present in the package. When hot water is supplied the milk ingredient is drawn from the package in a few seconds, and said mixture can then be brought into vigorous agitation with the jet of hot water still spouting out of the channel of the package. The narrow passage of the venturi portion then causes the fast jet of water. This process appears to be influenced by the thickness of the layer in the bottom of the holder into which the mixture is dispensed, into which layer the fast jet is then squirted.

The package 100 here has a monolithic plastic body 101, produced by injection moulding, with a bottom 102 and a circumferential wall 103, in which the upper edge 104 of the circumferential wall 103 bounds an aperture. As already mentioned, the reservoir of the package 100 is preferably filled with the ingredient through said aperture, so that known filling techniques can in principle be used.

After filling, said aperture is hermetically sealed by a top sealing film (not shown), which is fixed on the upper edge 104 on its circumference, here to an outwardly directed circumferential flange 104a, preferably by means of a fusion weld. Such fusion welding technology and also sealing film for this purpose are generally known in the field of plastic holders for food products, such as, for example, for packages of individual evaporated milk portions, desserts etc., to be sealed with film.

The package 100 is preferably filled and sealed under aseptic conditions on a suitable filling machine.

The monolithic plastic body 101 has a central column 110, which is integral with a central portion of the bottom 102, which column 110 has a portion 110a that projects upwards from the bottom to an upper side of the column, and in the example shown here also has a portion 110b that projects below the bottom 102.

A channel 115 extends through the column 110 from an inlet 116 on the upper side of the column 110 to an outflow aperture 120 on the underside of the column 110, and therefore on the underside of the package.

The top sealing film is breakable, preferably piercable, so that a base liquid feed lance can be taken through said sealing film and can then be connected to the inlet 116 of the channel 115 in the column 110, so that the base liquid can be fed through the channel 115 to the outflow aperture 120.

A venturi portion 130 (visible in detail in FIG. 9) is present in the channel 115, to which venturi portion one or more passages 131 for the ingredient formed in the column 110 are connected, in such a way that when base liquid is passed through the channel 115 a venturi effect occurs and the ingredient goes through the one or more passages 131 into the venturi portion 130 and mixes there with the base liquid, which mixture is dispensed at the outflow aperture 120 of the column 110.

The channel 115, the venturi portion 130, and the passages 131 are—as is preferable—all fully formed during the injection moulding of the body, so that no further operations were necessary to make those parts or to finish them.

The bottom 102 here has an annular flexible portion 140 around the column 110, so that the column 110 is movable downwards relative to the upper edge of the body 101 and back up again here in an elastically shape-recovering manner.

The column 110 is therefore movable here between a higher initial position (FIGS. 5-9) and a lower dispensing position (FIG. 10) relative to the upper edge of the body, preferably with a height difference of at least 3 millimeters.

It can be seen that the flexible portion 140, viewed in cross section, is in the form of one or more undulations, formed here by coaxial annular parts, which in this example are in each case at a higher level from the outside towards the inside (in the initial position of the column 110).

It can be seen that here in the initial position the upper side of the column 110 lies in the plane of the upper edge 104, so that when the top sealing film is present the upper side of the column goes against the underside of said sealing film. This makes it easier to pierce the sealing film, since the column forms a sort of counter-support here on the underside of the film.

As explained earlier, the presence of a "seal" between the upper side of the column and the top sealing film is not critical, but in this simple manner the inlet 116 is nevertheless more or less sealed relative to the reservoir with the ingredient.

It is preferable for the package to be filled with the liquid ingredient to a level at a distance below the upper side of the central column. For the filling technique it is also advantageous if the level of the ingredient lies at a distance below the upper edge of the package.

It is conceivable for liquid ingredient to be present in the column after the filling and/or for the column to be relatively short with its upper side lying at a distance below the sealing film, possibly even below the level of the ingredient.

In this example it can also be seen that in the initial position the underside of the column 110 lies in the plane of the underside of the bottom 102.

As is preferred, a bottom sealing film is provided, which sealing film is placed along the bottom of the outflow aperture 120 on the underside of the bottom of the package. Said sealing film 141 is visible in FIG. 6a.

The underside of the column 110 in the initial position preferably lies against the bottom sealing film 141.

Said bottom sealing film 141 is fixed on the underside of the bottom in a region 142 around the flexible portion 140 of the bottom. Said film 141 is preferably placed already before the filling (and possibly sterilizing) of the package.

The person skilled in the art will understand that when the column 110 is pressed down to the dispensing position the bottom portion 110b of the column 110 goes with force against said bottom film 141 and breaks, in this case pierces, said film 141, so that the outflow aperture 120 is opened. The bottom film 141 here remains adhering to the bottom 102 in the annular region 142.

In this example it can also be seen that the circumferential wall 103 projects below the bottom 102 and has a lower edge 105 which defines an imaginary flat supporting surface of the package 100, so that the package can be placed with the lower edge of the circumferential wall stably on a surface. In that case the bottom sealing film 141 is lying higher up than said lower edge 105, so that undesirable damage to said film 141 is avoided, for example during handling/conveyance of the package when it is being filled on a filling machine.

For the stability of the body 110, co-moulded ribs 107 are provided here between the bottom 102 and the part of the circumferential wall 103 that projects downwards.

The venturi portion 130 shown has a narrow passage 132, in this example, which is adapted for milk froth, having a diameter of 0.8 millimeters, followed by a chamber 133 with a larger diameter, here of 1.2 millimeters. It will be clear to the person skilled in the art that for other ingredients and/or base liquid the dimensions and shape of the venturi portion can be selected differently.

As regards the venturi portion 130, it can furthermore be seen in this example that from the chamber 133 of the venturi portion 130 to the outflow aperture 120 the channel has a substantially uniform cross section, which in any case is greater than the diameter of the narrow passage 132. That has the advantage, inter alia, that, if the package has been emptied and liquid is still being fed to the channel, a fast jet is dispensed through said passage 132 and remains clear of the surrounding wall until it reaches the outflow aperture 120, so that it is not disturbed. Said fast jet can then be used to froth, or further froth, the mixture dispensed earlier.

The venturi portion 130 here lies substantially at the level of the surrounding portion of the bottom 102, so that no "upward conveyance" of the ingredient is necessary and the reservoir can be emptied well and quickly. For the purpose of good emptying of the package provision is made here for the passages 131 in the column 110 each to have an inflow aperture close to the surrounding region of the bottom.

Furthermore, one or more passages 131, in this example two disposed diametrically opposite each other, are provided in the column 110 with a corresponding inflow aperture on the outer circumference of the column, for the feeding of the ingredient to the venturi portion. The passages 131 are funnel-shaped here, viewed from the inflow aperture to the venturi portion. Furthermore, the passages 131 here are placed at an angle slanting downwards, viewed from an inflow aperture to the venturi portion.

It is pointed out that in the package illustrated only the one or more passages 131 for the liquid ingredient connect to the venturi portion 130, and not any additional passages in the column for the suction of air to the venturi portion. That has not been found to be necessary for the quality of the frothing, and it produces a simple construction.

FIG. 10 shows diagrammatically a lance 170 acting upon the column 110 and thereby pressing the column 110 downwards to its dispensing position.

It can be seen that the flexible portion of the bottom 140 now forms a downward-facing funnel, so that all liquid ingredient passes through the inflow apertures, which are now low down, into the passages 131.

When the lance 170 is removed again (or the package is removed from the lance), the shape-recovering flexible portion 140 of the bottom will ensure that the column 110 and the surrounding flexible portion of the bottom move back again to, or at least in the direction of, the initial position. In the process the inflow apertures now reach a position higher up than the surrounding bottom, so that any residue of ingredient does not leak out of the package through the outflow aperture 120.

For ease of placing the package in a device, provision is made for the circumferential wall 102 to be cylindrical and for the column 110 to be disposed on the axis of the cylindrical circumferential wall, the inlet 116 of the channel 115 likewise being disposed on said axis, and the outflow aperture 120 preferably also being disposed on said axis. This concentric arrangement of the components also makes it easier to handle on a filling machine.

A system for preparation of a food product suitable for human consumption, notably a beverage or component of a beverage, in particular for preparation of milk froth for a cappuccino, will now be explained with reference to FIG. 11.

FIG. 11 shows a device 200, in this example intended for domestic use. Said device 200 has a housing 201 with a base 202, an erect housing part 203 and an overhanging housing part 204. Of course, other embodiments are also conceivable.

A holder 210 for accommodating and retaining a package according to the invention (here, as an example, package 100) is present in the device at a dispensing position in the device. The holder 210 accommodates the package 100 in the normal position, with the bottom down and the top sealing film up. In particular, the package 100 rests here on its lower edge 105 on the holder. There is an aperture 211 in the holder 210 in line with the outflow aperture 120, so that the jet of mixture or base liquid can squirt in a downward direction out of the package and then through the aperture 211 into the mug 300 or other beverage holder. Said aperture 211 is so large here that the mixture does not make contact with the holder 210, so that soiling is prevented.

As mentioned earlier, the preparation of milk froth, in which the package 100 is filled with a milk ingredient, will be explained here as an example.

Facilities indicated in general by base liquid feed means are present in the device 200, here for the preparation and feeding of hot water to the package 100.

A supply tank 220 for a supply of water can be seen, here a tank 220 which can be removed by the user and refilled under the tap, and which has a self-closing valve 221 which closes when the supply tank is disconnected from the device.

A water circuit is present in the housing of the device, said water circuit having a system of one or more pipes, and furthermore having an electric pump 225 and a heating assembly for heating the base liquid, here an flow-through electric water heater 230, for supplying hot, preferably not boiling base liquid, preferably hotter than 70 degrees, to the lance. If desired, one or more valves, preferably electrically controllable valves, can be provided in the water circuit. Instead of being an flow-through water heater, the water heater could also be a hot-water boiler, or a combination of the two.

The water circuit connects to a lance 240, which is mounted, in a stationary position here, on the underside of the overhanging part 204 of the housing 201, said lance being situated at the dispensing position.

As explained earlier, the lance 240 is adapted to pierce the top sealing film of the package 100 and to connect to the channel 115 in the column 110, so that water can be fed through the lance 240 to the channel 115 and thereby, on the basis of the venturi effect, the ingredient flows through the one or more passages 131 to the venturi portion and is mixed there with the water, and the mixture is dispensed through the outflow aperture 120, here to the mug 300 disposed on the base 202.

As described, provision is made for the lance 240 to act upon the column 110 in order to press said column downwards and therewith also to break through the bottom film 141. That requires a relative movement between holder 210 and the lance 240, which can be achieved in many different ways.

The device 200 is preferably provided with operable (manually, electrically or the like) displacement means which are adapted to produce a relative movement of the holder 210 for the package 100 relative to the lance 240, so that when the displacement means are operated the lance 240 pierces the top sealing film of the package, and the bottom sealing film 141 is also broken in the process.

In a simple embodiment the displacement means are a manually controllable lever mechanism 270, for example with a handle 271 on the front side of the overhanging part 204 of the housing.

In this example provision is made for the holder 210 to be removed by the user, and it can then be filled with the package, after which the holder can be replaced in a carrier 250 belonging to the device.

The carrier 250 is connected to the lever mechanism 270 and can be moved up and down by operation of said mechanism.

One or more vertical guides are preferably provided in the device, which guides guide the carrier 250 substantially in the vertical direction relative to the housing 201.

The holder 210 can preferably be pushed from the front side into the carrier 250, so that the consumer can first remove the holder 210, can place the package 100 in it, and can then slide holder 210 back into the carrier 250. Operating the handle 271 then causes the carrier 250 to move upwards with holder 210 and package 100. The lance 240 then goes against the top film and pierces said film, and the column 110 is then pressed downwards relative to the package 100 which is moving upwards. In this way the package 100 reaches the position of FIG. 10.

Putting into operation the feed of hot water to the lance 240 now leads first to a mixture of ingredient, in this example milk, and the hot water being dispensed into the mug 300. When the package is empty, a jet of hot water is squirted at high speed, notably because of the narrow passage of the venturi portion, through the package 100 into the mug, and onto the milk and water mixture dispensed earlier, which jet is thereby formed into a stable milk froth of high quality.

After dispensing, the carrier 250 can be moved down again by operating the mechanism 270, and the holder 210 can be removed and the empty package 100 thrown away.

During the dispensing there has been no contact here between the jet of mixture and the device, so that no soiling occurs. The channel 115 of the package has been flushed out by the stream of water, so that no milk can drip out there either. Furthermore, when the carrier 250 moves down the column 110 is moved up again by the shape-recovering portion 140, so that any residue in the package does not reach the passages 131 if the package is kept more or less straight.

As mentioned earlier, it is furthermore conceivable to arrange an additional preparation and dispensing assembly in the housing of the device for the purpose of preparing, on the basis of a second ingredient, which differs from the ingredient in the above-mentioned package according to the invention, a second, different food product suitable for human consumption, for example a beverage or component of a beverage, for example for coffee.

The additional preparation and dispensing assembly preferably has a corresponding dispensing orifice for dispensing the food product prepared on the basis of the second ingredient, which dispensing orifice is preferably situated near the outflow aperture of the first package, in the dispensing position of said package, (or can be taken into that position if the dispensing orifice is movable), in such a way that a mug or other holder into which the streams from the first package and the dispensing orifice are dispensed does not need to be moved, and can then receive both streams (in succession, simultaneously or with a certain overlap in time). This mutual distance is preferably no more than 5 centimeters.

An appropriate embodiment of the device is for preparing coffee with said additional preparation and dispensing assembly. With the first package, which is preferably designed according to the invention, milk froth can then be made, and the coffee can be prepared subsequently with the additional station, which coffee can then flow through the froth, so that a layer of milk froth is produced on the coffee, as in the case of a cappuccino.

The additional preparation and dispensing assembly can be adapted, for example, for preparing coffee based on coffee beans, in which case a grinding device for the beans is provided.

The additional preparation and dispensing assembly is preferably adapted for accommodating and retaining a second package filled with the second ingredient, for example a coffee preparation ingredient.

The second ingredient is preferably intended for combination with the same liquid as the ingredient in the first package, for example with water (hot water), in which case the additional preparation and dispensing assembly is connected to the liquid feed means and is equipped to dispense the second ingredient combined with the liquid.

The second package is preferably a disposable package filled with a single portion of the second ingredient, for example a coffee pad or a metal cup filled with a coffee ingredient, or a cartridge or the like. The second ingredient does not, of course, have to be liquid, depending on the ingredient and the second package, and may, if desired, be in powder form or in another form.

The second package is, for example, a package already available on the market, examples of which are the coffee pad, a plastic cartridge, a metal capsule, a flexible sachet etc. Such packages clearly differ from the package according to the invention. It is also conceivable for a package according to the invention likewise to be filled with the second ingredient, in which case it is then preferable to make at least the dimensions of that package different, so that the user does not make a mistake.

As will be explained below in detail with reference to an example, the second package can be a coffee pad, in which case the system furthermore comprises a coffee pad holder part, the device having a corresponding part which forms a chamber with the coffee pad holder part when contiguity has been achieved, said chamber having an inlet for feeding hot water to it and an outlet for coffee, possibly an outlet adapted for creating coffee with a relatively thin, fine-frothed creamy layer.

It is preferable to provide a common carrier, which forms the holder for a first package with a first ingredient, preferably the package according to the invention, and for a second package containing a second ingredient. In that case both packages are preferably disposable packages. For example, the second package is a single-portion coffee preparation package, for example a coffee pad. In that case it is preferable for the common carrier to be equipped to accommodate a coffee pad holder part containing a coffee pad.

In a possible embodiment the additional dispensing assembly of the device is adapted for the preparation and dispensing of a beverage, such as coffee, or another food product, on the basis of a second ingredient with which a second package is filled, which second package is in the form of a storage package, i.e. contains second ingredient for a number of preparations. This can be, for example, for coffee machines for use in businesses etc. For example, the beverage, such as coffee, is made on the basis of a second package with a supply of an extract for mixing with water, stored in a suitable package (bag-in-box or the like).

In a possible embodiment provision is made for the device, with or without additional preparation and dispensing assembly, to contain a magazine for accommodating in it a number of packages according to the invention, as well as an automatic feed mechanism for removing one package at a time from the magazine and feeding it to the dispensing position in the device if preparation of a food product on the basis of said package is desired. Such magazines and feed mechanisms are known in the field of beverage preparation machines and can be adapted to the package according to the invention by the person skilled in the art.

FIG. 12 shows diagrammatically a variant of the holder 210, which here has an accommodation recess 213 for a package according to the invention, for example package 100, and an accommodation recess 214 for a coffee pad, in this example for a removable coffee pad holder part in which or on which the coffee pad (or a number of coffee pads stacked) can be placed.

Making coffee on the basis of a coffee pad and the technical components of the device to be used for this purpose are generally known, for example from EP 904 717 and WO 03/026470, in which it is attempted to prepare a beverage similar to cappuccino.

In addition to the lance 240, the device 200 also has a part 320 which together with the holder 210 forms a chamber (when the carrier 250 has been moved up) around the coffee pad(s), which chamber is connected to the water circuit. In this way hot water can be fed under limited pressure to said chamber, and coffee can be prepared. Said coffee then flows through a pipe 215 to one or more dispensing orifices 216, 217 of the holder 210.

It can be seen that the one or more dispensing orifices 216, 217 are situated so close to the aperture 211 that all streams out of or through them open into the mug 300 or the like.

FIG. 13 shows very diagrammatically the holder 210 of FIG. 12 with package 100 and with a coffee pad 310 placed on a part 311 which the user places in the holder 210 (in accommodation recess 214). Furthermore, the lance 240 is shown, as is the part 320, which together with part 311 forms a chamber around the pad 310 when the carrier 250 in which the holder has been placed has been moved upwards. As pointed out, much is known in the field of coffee preparation with a pad and corresponding parts, inter alia from the patent literature. The inclusion of one or more details in the device according to the invention will be achievable for the person skilled in the art.

The water circuit now comprises one or more electrically controllable valves 235, here between the heater 230, on the one hand, and the lance 240 and part 320, on the other hand. Said one or more valves 235 make it possible first to feed hot water to the lance 240 and after a milk froth layer has been formed in the mug 300 to make coffee by feeding said water to the chamber containing the pad 310. Said coffee then goes onto the froth and sinks through it.

The holder 210 is preferably made of plastic and is dishwasher-safe.

The holder 210 here is provided with one or more positioning elements, holes 218 in this case, which can interact with complementary positioning elements of the housing of the device in order in this way to ensure the correct position of the holder relative to the lance 240 and any chamber-forming part 320 (this being, for example, in connection with the seal at the chamber for the coffee pad).

It will be clear that the displacement means for the carrier 250 can also be of an electrical type.

It will be clear that the carrier 250 could also be dispensed with, and the holder 210 could be connected directly to a suitable displacement mechanism of the device.

In a variant of the device shown diagrammatically in FIG. 14 provision is made for the lance 240 to be disposed so as to be movable, movable up and down here, preferably connected to a flexible hose 241, and to be movable by means of corresponding first displacement means 242 of the device. The holder 210 for the package 100 (and any other package in the holder) here is likewise movable, movable up and down here, by means of corresponding second displacement means of the device, in this example already explained with reference to FIG. 11. For use of the system the user first operates the second displacement means, so that the holder and the package in it and retained by it move to the dispensing position in the device. In the version also having a coffee pad holder part that movement causes the chamber to close around the coffee pad. The user then operates the first displacement means 241, which move the lance 240 in such a way that the lance connects to the channel. The first displacement means can be electrically driven here, so that operating a button puts said means into operation, suitably followed by switching on of the pump and the water heater. It is also conceivable for the hydraulic pressure of the water, when the pump 225 is switched on, to put a suitable actuator, for example a bellows, into operation to move the lance.

It will be clear to the person skilled in the art that instead of a coffee pad, the system and the device can also be equipped to accommodate another portion package with a suitable ingredient, such as a beverage preparation ingredient, for example a flexible sachet or a plastic cartridge made up of several components, for example of the type being put on the market under the brand name Tassimo or, for example, a metal capsule, for example of the type being put on the market under the brand name Nespresso. As is known, Tassimo cartridges, made up of several components, are available not only filled with a coffee ingredient, but also with a chocolate ingredient for preparing hot chocolate. The invention can then be used to make milk froth.

It is also conceivable for a device which accommodates only the package according to the invention to be produced, for example in order first to make a quantity of milk froth in a mug at home. Coffee or another beverage can then be made using a separate device, for example a coffee pad device or another device of the type mentioned here, and the coffee or other beverage is then dispensed into said mug. Such a device according to the invention could then have a small supply tank for water, for example with a capacity of no more than 250 ml, so that the device can be made small and takes up little space.

FIG. 15 shows an alternative package 1000 according to the invention, which works together with a lance 2400 of a device (not shown in any further detail) and together with that device forms an alternative system.

It will be clear that all kinds of details of the package have already been explained, which details can be used separately or in combinations if desired on the package described above. The device can in principle be designed largely in accordance with devices described earlier, as will be clear to the person skilled in the art.

The package 1000 shown is filled or can be filled with a portion of a liquid ingredient which is intended for mixing with a base liquid for the preparation of the food product. A top sealing film, which is pierced by the lance 2400, is preferably provided.

The package 1000 has a body with a bottom and a circumferential wall, the body furthermore having a column 1100, which is connected to a preferably centrally situated portion 140 of the bottom, which column 1100 has a portion which projects upwards from the bottom to an upper side of the column.

In the version shown the portion 140 of the bottom is flexible, in such a way that the column is movable, preferably elastically movable, downwards and possibly back up again.

A channel extends through the column 1100 from an inlet on the upper side of the column to an outflow aperture 120 on the underside of the column.

Unlike preferred embodiments shown earlier, the column 1100 in this case is not provided with a complete venturi portion, but provision is made for said venturi portion to be fully formed in the lance (not shown), or for the venturi portion (and possibly also the one or more passages connecting to it) to be formed by the interaction of the bottom portion of the lance with the adjacent portion of the column (see FIG. 15).

The device (not shown in any further detail) furthermore comprises a holder for accommodating and retaining the package at a dispensing position in the device and base liquid feed means, of which the lance 2400 disposed at the dispensing position forms part.

As can be seen, the lance 2400 can be placed in the inlet of the channel in the column 1100, so that the base liquid can be fed through the channel.

It can be seen that the underside of the lance 2400 together with an adjacent part of the column 1100 forms a venturi portion to which one or more passages 130, formed in the column here, connect in such a way that, when base liquid is fed through, a venturi effect occurs and the ingredient passes through the one or more passages into the venturi portion and mixes there with the base liquid, which mixture is dispensed at the outflow aperture 120 of the column.

It will be clear that this makes a simple design of the package possible.

The invention claimed is:

1. Disposable package filled with a portion of an ingredient intended for mixing or diluting with a base liquid for the preparation of a liquid food product suitable for human consumption, the disposable package comprising:
- an injection moulded monolithic plastic body with a bottom having an underside and with a circumferential wall, an upper edge of the circumferential wall bounding a filling aperture,
- wherein the filling aperture of the filled package is hermetically sealed by a top sealing film, a circumference of the top sealing film being fixed on the upper edge,
- wherein the bottom has at least one outlet aperture for the liquid food product and a piercing portion on the underside of the bottom,
- the monolithic plastic body further comprising a central column integrally moulded with a central portion of the bottom, the central column having a portion that projects upwards from the bottom to an upper side of the central column, through which column a channel extends from an inlet on the upper side of the central column,
- wherein the top sealing film is pierceable, so that a base liquid feed lance can be pierced through the top sealing film and connected to the inlet of the channel in the central column, so that the base liquid can be fed through the channel into the package to mix with or dilute the ingredient therein and to obtain the liquid food product,
- wherein the bottom has an annular flexible portion around the central column, such that the central column is movable downwards by a force exerted thereon relative to the upper edge of the circumferential wall of the body between a higher initial position and a lower dispensing position,
- wherein the package has a bottom sealing film, which is placed along the underside of the bottom to hermetically seal the at least one outlet aperture, wherein a circumference of the bottom sealing film is fixed on the underside of the bottom around the flexible portion of the bottom,
- wherein the bottom sealing film is pierceable and is placed so as to be engaged and pierced by the piercing portion of the bottom when the column is moved down to the lower dispensing position thereof, said piercing of the bottom sealing film allowing dispensing of the liquid food product from the package.

2. Package according to claim 1, in which the annular flexible portion around the central column has, viewed in each vertical section, the form of one or more undulations.

3. Package according to claim 1, in which the upper side of the central column rests against the top sealing film when the central column is in the higher initial position.

4. Package according to claim 1, in which the body of the package forms a supporting surface of the package, which supporting surface lies at a distance below the bottom sealing film, so that the bottom sealing film lies higher than any bearing surface when the package is placed on it.

5. Package according to claim 4, in which the circumferential wall projects below the bottom and has a lower edge which forms the supporting surface of the package, so that the package can be placed with the lower edge of the circumferential wall in a stable position on a bearing surface and the bottom sealing film in this case lies higher than said bearing surface.

6. Package according to claim 1, in which the body has on the upper edge of the circumferential wall an outwardly directed circumferential flange on which the top sealing film is fixed.

7. Package according to claim 1, in which the flexible portion is an elastically shape-recovering flexible portion.

8. Package according to claim 1, in which the package contains a liquid beverage preparation ingredient.

9. Package according to claim 8, in which the channel has a venturi portion, and wherein the central column has one or more passages that are connected to the venturi portion, in such a way that when base liquid is fed through the channel, a venturi effect occurs and the liquid ingredient goes through the one or more passages into the venturi portion and mixes there with the base liquid, which mixture is dispensed via an outlet aperture.

10. Package according to claim 1, in which the circumferential wall, the central column and the inlet of the channel are concentric relative to an axis of the package.

11. Package according to claim 1, in which the package is sterilized before filling, and contains a liquid milk ingredient.

12. System for the preparation of a food product suitable for human consumption, which system comprises:
- a) a disposable package filled with a portion of an ingredient intended for mixing or diluting with a base liquid for the preparation of a liquid food product suitable for human consumption, the disposable package comprising:
- an injection moulded monolithic plastic body with a bottom having an underside and with a circumferential wall, an upper edge of the circumferential wall bounding a filling aperture,
- wherein the filling aperture of the filled package is hermetically sealed by a top sealing film, a circumference of the top sealing film being fixed on the upper edge,
- wherein the bottom has at least one outlet aperture for the liquid food product and a piercing portion on the underside of the bottom,
- the monolithic plastic body further comprising a central column integrally moulded with a central portion of the bottom, the central column having a portion that projects upwards from the bottom to an upper side of the central column, through which column a channel extends from an inlet on the upper side of the central column,
- wherein the top sealing film is pierceable, so that a base liquid feed lance can be pierced through the top sealing film and connected to the inlet of the channel in the central column, so that the base liquid can be fed through the channel into the package to mix with the ingredient therein,
- wherein the bottom has an annular flexible portion around the central column, such that the central column is movable downwards by a force exerted thereon relative to the upper edge of the circumferential wall of the body between a higher initial position and a lower dispensing position,
- wherein the package has a bottom sealing film, which is placed along the underside of the bottom to hermetically seal the at least one outlet aperture, wherein a circumference of the bottom sealing film is fixed on the underside of the bottom around the flexible portion of the bottom,
- wherein the bottom sealing film is pierceable and is placed so as to be engaged and pierced by the piercing portion of the bottom when the column is moved down to the lower dispensing position thereof, said piercing of the bottom sealing film allowing dispensing of the liquid food product from the package,
- b) a device, the device being at least provided with:
  - a holder for accommodating and retaining the package at a dispensing position in the device, a base liquid feed assembly with a base liquid feed lance disposed at the dispensing position, which lance is equipped to pierce through the top sealing film of the package and to connect to the channel of the package, so that base liquid can be fed through the channel into the package to mix with or dilute the ingredient therein, wherein the device has operable displacement means which are adapted to produce a movement of the holder for the package and the base liquid feed lance relative to each other, so that when the displacement means are operated the lance pierces the top sealing film and connects to the channel, the base liquid feed lance pressing the central column downwards from the higher initial position to the lower dispensing position thereof and thereby bottom sealing film being pierced by the piercing portion of the bottom, said piercing of the bottom sealing film allowing the liquid food product to be dispensed from the package.

13. System according to claim 12, in which the liquid feed assembly is equipped for feeding in water as the base liquid.

14. System according to claim 12, in which the liquid feed assembly comprises an electric heating assembly for heating the base liquid.

15. System according to claim 12, in which the liquid feed assembly comprise a pump for the base liquid.

16. System according to claim 12, in which the lance is stationary mounted in the device, and in which the displacement means are equipped to move the holder towards the lance and away from it, in such a way that in the process the lance connects to the channel of the package.

17. System according to claim 12, in which the lance is disposed so as to be movable and is movable by means of corresponding first displacement means of the device, and in which the holder for the first package is likewise movable by means of corresponding second displacement means of the device, in which during use of the system when the second displacement means are operated the holder and the package accommodated and retained in it move to the dispensing position in the device, and in which when subsequently operated, the first displacement means move the lance in such a way that the lance connects to the channel.

18. System according to claim 12, in which the holder for the package is equipped to accommodate and retain the package in a substantially horizontal position with the bottom downwards, the holder having an aperture below the bottom of the package in such a way that during dispensing of the liquid food product said food product remains clear of the holder.

19. System according to claim 12, in which at a distance below the dispensing position of the holder the device has a standing place for a mug.

* * * * *